United States Patent [19]

Saunders

[11] 4,209,151
[45] Jun. 24, 1980

[54] BANNER STABILIZER METHOD AND APPARATUS FOR AIR DROPPED ARTICLES

[75] Inventor: Roger I. Saunders, Hollis, N.H.

[73] Assignee: Sanders Associates, Inc., Nashua, N.H.

[21] Appl. No.: 742,383

[22] Filed: Nov. 17, 1976

Related U.S. Application Data

[63] Continuation of Ser. No. 630,372, Nov. 10, 1975, abandoned.

[51] Int. Cl.² ............................................. B64D 19/00
[52] U.S. Cl. ................................... 244/138 R; 9/8 R; 102/4; 102/356; 244/147; 244/151 B; 294/83 A; 367/4
[58] Field of Search ............... 244/138 R, 138 A, 142, 244/151 B, 147; 9/8 R; 340/2; 102/4, 7, 34.1, 35.4, 35.6; 294/83 A, 83 AA; 367/3, 4

[56] References Cited

U.S. PATENT DOCUMENTS

| | | | |
|---|---|---|---|
| 2,342,384 | 2/1944 | Volf | 244/142 |
| 2,370,150 | 2/1945 | Dircksen | 244/138 R |
| 2,501,559 | 3/1950 | Winzen et al. | 244/138 R |
| 2,778,308 | 1/1957 | Fogal et al. | 102/4 |
| 3,374,973 | 3/1968 | Lokerson | 244/138 R |
| 3,386,692 | 6/1968 | Schuerch | 244/138 R |
| 3,913,483 | 10/1975 | Wolterman | 102/56 R |

Primary Examiner—Barry L. Kelmachter
Attorney, Agent, or Firm—Louis Etlinger

[57] ABSTRACT

A banner in the form of an elongated sheet of flexible material is attached to an air dropped sonobuoy for stabilization of the sonobuoy during descent as well as for descent speed control, entry angle control, and wave action damping once the sonobuoy is floating at the surface of the ocean. The banner is roller furled and stored on top of the sonobuoy. When the sonobuoy is dropped, the banner unrolls and streams out behind the sonobuoy during descent. It is a feature of this drogue apparatus that it is deployed by the time that the sonobuoy has descended a distance corresponding approximately to the length of the banner. The banner is not released when the sonobuoy hits the water in order to enable it to stream out over the surface of the water to provide wave damping action.

3 Claims, 9 Drawing Figures

BANNER STABILIZER METHOD AND APPARATUS FOR AIR DROPPED ARTICLES

This is a continuation of application Ser. No. 630,372, filed Nov. 10, 1975, now abandoned.

This invention relates to the stabilization of air dropped apparatus and more particularly to utilization of a banner or streamer for stabilizing the apparatus during descent and for limiting the speed of descent of the apparatus.

Expendable sonobouys have been ejected from aircraft for the purpose of monitoring subsurface activity and phenomenon. In order to assure that the sonobuoys reach the sea surface without damage, it has been common practice to employ parachutes or rotochutes in the dropping of these buoys. However, these devices present certain operational problems. With respect to parachutes, the parachute must be released from the sonobuoy once the sonobuoy is floating on the surface of the ocean so that the parachute will not pull the sonobuoy over. This involves considerable expense and is necessary because the sonobuoy must be maintained vertically oriented so that its antenna is vertically oriented. This in turn is necessary in order to maximize the transmission range of the sonobuoy such that the transmission from the sonobuoy is detected by the overflying aircraft over relatively large distances. An additional problem with the utilization of parachutes is that the sonobuoy, being suspended from the parachute, oftentimes acquires a swinging motion which continues for an undesireable period of time. This swinging motion oftentimes causes the sonobuoy to impact the ocean surface at angles which either cause damage to the sonobuoy housing or preclude release of the end cap of the sonobuoy from which sonobuoy sensors are ejected.

Another practice involves the use of so-called rotochutes attached to sonobuoys. In general, rotochutes employ helicopter-like blades which spin stabilize the sonobuoy during descent while limiting the descent speed. The problem with the rotochute configuration is that the rotochute must also be released from the sonobuoy after impact. The apparatus necessary to effect release of the rotochute, however, is not only expensive but also the amount of space taken up by the rotochute blades limits the amount of internal payload volume available. In both the parachute case and the rotochute case there is an additional problem of slow stabilization of the buoy occasioned by the use of these devices. It is a typical operational requirement that the stabilizing apparatus operate over a range of 100 feet, for helicopter drops, to 40,000 feet for high altitude aircraft drops. The 100 foot requirement necessitates deployment and stabilization within 100 feet. While the rotochute and small parachute embodiments are successful in limiting the speed of descent for high altitude drops, they offer inadequate descent velocity control and inadequately slow stabilization of the pendulous swinging motion of the suspended sonobuoy in low altitude drops.

The above problems are solved by the subject invention which incorporates a roller furled banner drogue carried at the top of the sonobuoy. The roller furled banner unrolls once the sonobuoy is released. The banner is attached to the sonobuoy by a single cord so that fouling with the sonobuoy is not a problem. It is a feature of the subject stabilization method and apparatus that the banner deploys in a distance equal to the length of the banner. What this means is that as the sonobuoy descends the free end of the banner essentially remains stationary while the remainder of the banner unfurls. This rapid deployment permits exceptionally rapid stabilization of the sonobuoy such that, if the banner is 12 feet in length, stabilization will start after the sonobuoy has traveled approximately 12 feet. This permits successful deployment of the sonobuoy from helicopters and other aircraft from as little as 100 feet above the sea surface.

Another feature of the subject method and apparatus for stabilizing sonobuoys is that the descent speed can be easily adjusted by adjusting the length of the banner. The speed can be adjusted, in one embodiment, so that the water entry velocity of the sonobuoy is within a range of 80–200 feet per second. The high entry velocity is made possible because of the rapid stabilization of initial swinging motion of the sonobuoy. Thus, the entry angle of the sonobuoy can be made relatively narrow with respect to the buoy trajectory and the end cap made sufficiently rigid to withstand water impact at high entry speeds. It will be appreciated that with a water entry angle parallel to the buoy trajectory the mechanical shock is carried along the longitudinal axis of a tubular sonobuoy which is the strongest axis. This precludes rupture of crushing of the sonobuoy housing. Such an entry of the sonobuoy also provides extremely reliable release of the sonobuoy end cap so that deployment of the sonobuoy sensors is assured.

A still further advantage of the banner stabilization system is that it need not be released once the sonobuoy has impacted. This has two advantages. The first and obvious advantage is that no additional release mechanisms are necessary and therefore the cost, weight and size of the stabilization system as well as its complexity is reduced. Secondly, and perhaps more importantly, the banner is allowed to stream out over the surface of the ocean. The banner acts as a wave action damper which assists in maintaining the vertical orientation of the sonobuoy by damping out wave induced rocking motion. Since the drag of the banner is minimal the buoy is not significantly pulled over by the banner. In one embodiment the sonobuoy has a vertically extending whip antenna whose vertical orientation is necessary in order to maintain the best possible radiation pattern from the sonobuoy. Since it will be appreciated that sonobuoys are in general low power devices, it is necessary to maintain the maximally efficient orientation of the antenna for deriving information from the sonobuoys by overflying aircraft. The streaming out of the banner over the surface of the ocean provides sufficient wave action damping such that the buoy is maintained in a substantially vertical orientation and thus the effective transmission range of the sonobuoy is increased.

What has therefore been provided is a rapidly deployable, low cost, weight and volume sonobuoy stabilization system which increases the reliability of sensor ejection, increases the effective range of the sonobuoy and decreases the expense of this expendable item.

It is therefore an object of this invention to provide a method and apparatus for stabilizing air dropped apparatus in which a banner or streamer is attached to the apparatus.

It is another object of this invention to provide improved method and apparatus for insuring that the entry angle of an air dropped package be limited with respect to the sonobuoy trajectory.

It is another object of this invention to provide sonobuoy aerodynamic stabilization apparatus which need not be released upon impact.

It is a still further object of this invention to provide air dropped apparatus stabilization in the form of a banner or streamer which also results in wave action damping once the apparatus is resting at the sea surface.

It is another object of this invention to provide a banner drogue with drag increasing pockets and a banner release mechanism for release of the banner after water impact.

These and other objects will be better understood in connection with the following description in view of the appended drawings in which:

DETAILED DESCRIPTION

Figure 1:
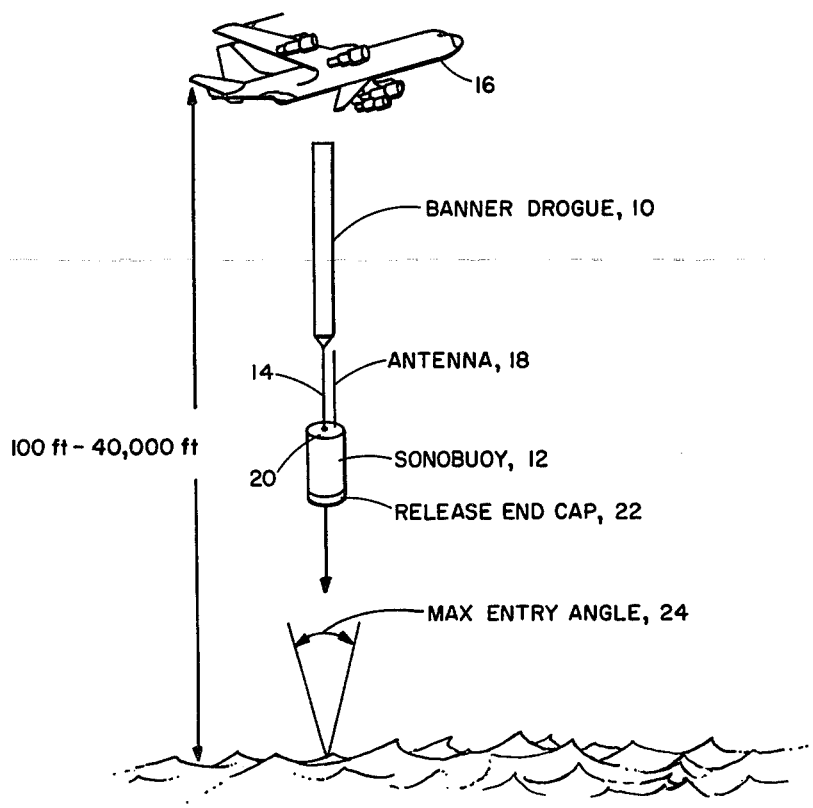
FIG. 1 is a diagrammatic representation of the subject invention showing the descent of an air dropped sonobuoy.

Referring now to FIG. 1 a banner drogue 10 takes the form of an elongated flexible sheet or ribbon. A sonobuoy 12 is suspended from the drogue by a single line or strand 14 as the sonobuoy descends from an aircraft 16. The strand may be bifurcated at one end and attached to opposing edges of the banner at one end. The other end of the strand is attached to the sonobuoy above its center of gravity. The most advantageous point of attachment for this other end is at the center of the top of the sonobuoy. The sonobuoy is provided with an antenna 18 which projects upwardly from the top surface 20 of the sonobuoy. Strand 14 is made sufficiently long such that the banner streams out above the end of the antenna. The sonobuoy is provided with an end cap 22 which is released upon impact with the surface of the ocean such that sensing apparatus housed within the sonobuoy may be deployed beneath the surface of the ocean.

In operation, the banner drogue is rolled up, or furled, at the top surface of the sonobuoy, as is the antenna. In this conditon the package is ejected from the aircraft and a releasable cap, hereinafter described in connection with FIGS. 6 and 7, maintains the rolled up banner and antenna in place. Upon deployment the cap is released and the banner drogue unfurls or unrolls, as does the antenna. The unfurling takes place almost immediately and in general the banner is fully deployed by the time the sonobuoy has traveled a distance equal to the length of the banner plus the length 5 of the line or strand connecting the banner to the sonobuoy. This is important because aircraft 16 may eject the sonobuoy from anywhere between 100 feet above the surface of the ocean to 40,000 feet. The rapid deployment of the banner makes low altitude helicopter drops feasible.

The purpose of the banner drogue is to stabilize the sonobuoy in a vertical direction such that it enters the ocean at an entry angle 24 which may be made quite narrow due to the unique stabilization characteristics of the banner. The small entry angle is important to assure reliable release of end cap 22 and deployment of the sonobuoy sensing apparatus. Additionally, the small entry angle is important so that the sonobuoy does not land on its side, in which case the sonobuoy package may be damaged. In addition to the stabilizing function, banner drogue 10 serves the function of limiting the descent speed of the sonobuoy. This is accomplished by adjusting the terminal velocity of the sonobuoy by selecting the length of the banner utilized. In one operative embodiment the banner is 12 feet long and $3\frac{1}{2}$ inches wide and is made out of $1\frac{1}{2}$ ounce nylon. With a sonobuoy weighing 5 pounds and having a diameter of five inches, the entry speed is limited to 135 ft./sec. This relatively high entry speed is acceptable because of the narrow entry angle at which the sonobuoy impacts the water. Since the sonobuoy package is cylindrical, the mechanical shock is maintained parallel to the longitudinal axis of the cylinder. The cylinder is thus able to withstand higher impact speeds than would normally be utilizeable if stabilization could not maintain a relatively small maximum entry angle. The advantage of the high speed descent is most noticeable in the sonobuoys which are dropped from an altitude of 40,000 feet.

Figure 2:
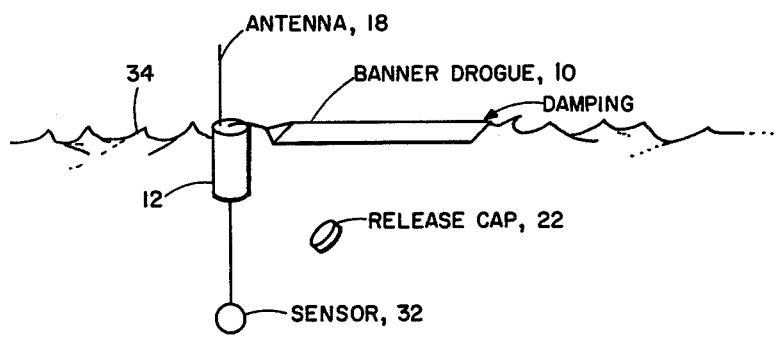
FIG. 2 is a diagrammatic representation of the sonobuoy at the surface of the ocean illustrating the damping action of the banner drogue.

Referring now to FIG. 2, once sonobuoy 12 is deployed at the surface of the ocean and a sensor 32 is deployed from the sonobuoy, banner drogue 10 rests at the surface 34 of the ocean and serves a damping function to damp the wave action which affects sonobuoy orientation. Because the sonobuoy is in general a low power device it is important that antenna 18 be maintained in a near vertical orientation. The orientation of the sonobuoy is in part maintained by the weight of the sensor apparatus 32 and is additionally aided by the damping action of the banner drogue. This maintains an optimum antenna pattern for the sonobuoy and in effect increases its range since tilting of the sonobuoy to the wave action will be minimized. Unlike prior art descent limiting devices, the banner drogue is not released from the sonobuoy upon impact. Since its drag in the water is minimal, while its damping action is significant, it is a feature of the subject banner drogue apparatus that not only need it not be released from the sonobuoy, but also it is useful in performing the damping function.

Another feature of the banner drogue is that it is attached to the sonobuoy by a single line or strand. It has been found that even when the strand is initially entangled in the antenna, this entanglement is alleviated during descent and thus tangling associated with conventional parachute-type drogues is eliminated. Moreover, when the sonobuoy is at rest at the surface of the ocean, the single strand, being deployed from the top surface of the sonobuoy, does not foul on the sonobuoy or antenna and thus the banner need not be released to eliminate fouling problems. This method of attaching the banner drogue to the sonobuoy thus provides for a system which not only alleviates the problem of drogue release but also alleviates the problem of fouling.

Figure 3:
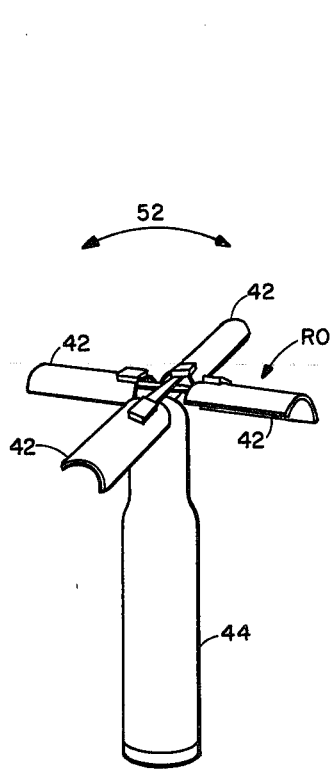
FIG. 3 is a diagrammatic representation of a prior art rotochute device.
Figure 4:
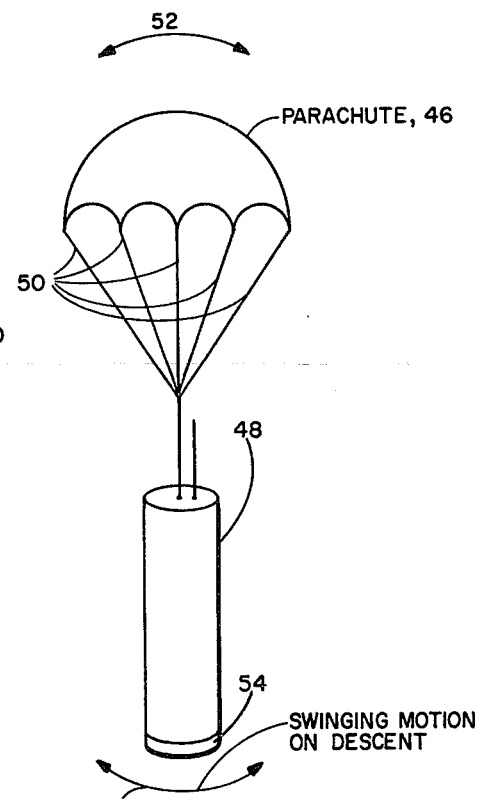
FIG. 4 is a diagrammatic representation of a parachute drogue illustrating the swinging motion of the sonobuoy on descent.

Referring to FIGS. 3 and 4 the advantages of the subject system over those of the prior art will be obvious. Referring to FIG. 3 a rotochute-type descent apparatus 40 involving auto rotating blades 42, is located at the top portion of a sonobuoy 44. In general the rotochute apparatus is quite cumbersome and heavy. Additionally, the rotochute apparatus must be released from the sonobuoy upon impact. Another feature of the rotochute which may present problems is the high rate of axial rotation of the sonobuoy during descent. It will be appreciated that the sonobuoy rotates during descent due to frictional coupling of the bearing between the sonobuoy and the rotochute assembly and this rotation provides additional centrifugal stress on the sonobuoy payload. Referring to FIG. 4, a traditional parachute-type drogue 46 is illustrated attached to the top of a sonobuoy 48 via a number of lines or strands 50. Because of the number of lines or strands necessary when a parachute is utilized, the parachute drogue must be released after impact since these lines tend to foul the antenna and the high drag of the parachute in the water pulls the sonobuoy off its vertical axis and adds undesireable drag to the surface float. Also during descent, these lines may become fouled with the antenna or twisted in which case the parachute may be collapsed and the sonobuoy will be without drogue-type action. A more serious problem, however, with the parachute drogue is the tendency for the sonobuoy and parachute to swing in an arc illustrated by double ended arrow 52 during descent. This swinging motion oftentimes causes the sonobuoy to enter the ocean at greater than an optimum entry angle. The result, as mentioned hereinbefore, may be the failure of the end cap 54 to release, which renders the sonobuoy inoperative. This is also a problem in the aforementioned rotochute configuration.

Figure 5:
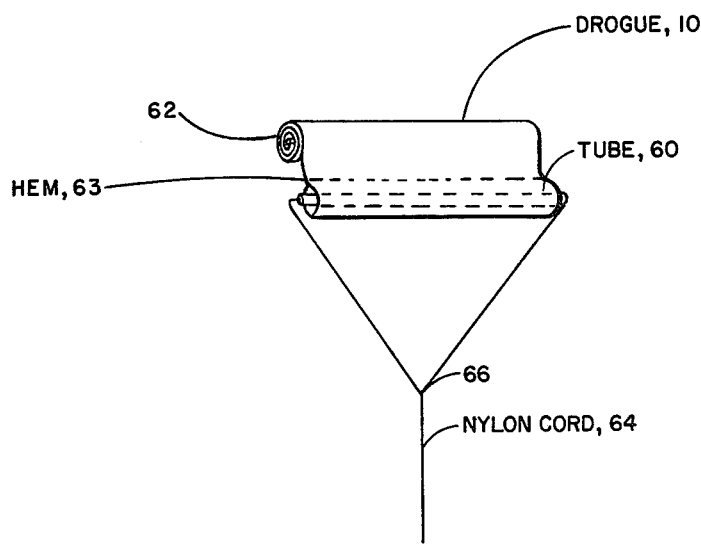
FIG. 5 is a diagrammatic representation of one method of furling the subject drogue.

Referring now to FIG. 5, in one embodiment, the subject banner drogue 10 may be furled or rolled above a tube 60 which runs transverse to the longitudinal axis of the banner as illustrated at 62. One end of the banner is fixedly attached to the tube in one embodiment by sewing a hem 63 around the tube. The strand connecting the drogue to the sonobuoy may be a nylon cord 64 which is bifurcated at 66 and runs through the center of tube 60. Alternatively the strand can be run through the hem without the tube, since the hem in essence forms a tube.

Figure 6:
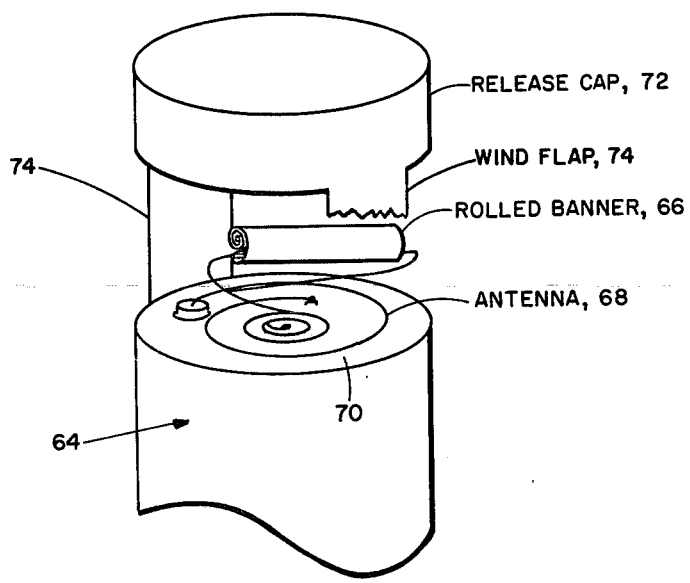
FIG. 6 is a diagrammatic representation of the portion of the furled banner and the drogue release cap positioned thereover.

Referring now to FIG. 6, one method of mounting the subject banner drogue and antenna for release of a sonobuoy is illustrated. In this figure a sonobuoy package 64 may have a rolled banner 66 and a coiled antenna 68 mounted on a top surface 70 of the package. A release cap 72 is then forced down over the sonobuoy package such that the rolled banner and coiled antenna are maintained in place and a unitary cylindrical housing is formed.

Figure 7:
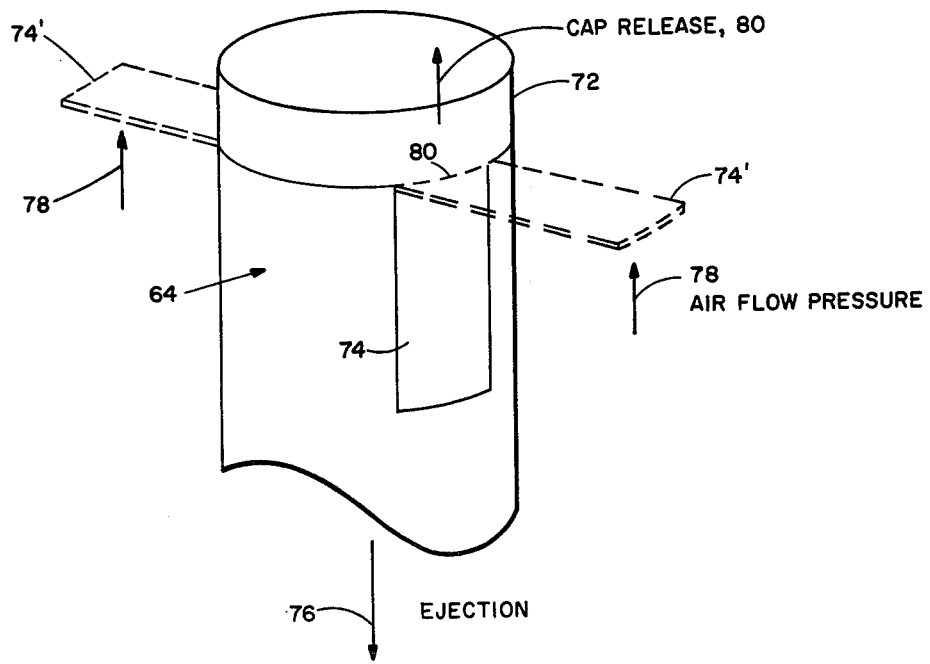
FIG. 7 is a diagrammatic representation of the release cap in place over the sonobuoy package illustrating the release tongue.

Referring to FIG. 7 release cap 72 may be provided with an elongated flexible member such as a tongue 74 which depends downwardly from the lower edge of a side wall of the cap and lies against the skin of the sonobuoy package 64. When the sonobuoy is ejected as illustrated by arrow 76 air flow pressure as indicated by arrow 78 forces tongue 74 upwardly as illustrated by dotted lines 74' forcing the cap up as illustrated by arrow 80 to peel the cap from the top portion of the sonobuoy package. In one embodiment the cap may be molded in a unitary fashion with the tongue made integral thereto. In this embodiment a hinge junction, herein illustrated by dotted line 80 may be of reduced thickness to permit movement of tongue 74 with very little air flow pressure. It will, of course, be appreciated that the sonobuoy may be weighted in such a fashion that once ejected the sonobuoy is righted so that the release cap will release in the described manner.

It will also be appreciated that the fit between the release cap and the sonobuoy package may be designed to be relatively loose so that minimum air flow will result in the peeling of the cap from the top portion of the sonobuoy.

For heavy sonobuoys or other air dropped apparatus it may be desireable to augment the drag of the drogue. For instance, it may be necessary to provide a 70 foot banner to stabilize a heavy object. However, when dropping this object from 100 feet, adequate stabilization and velocity limiting may not be possible prior to impact.

Figure 8:
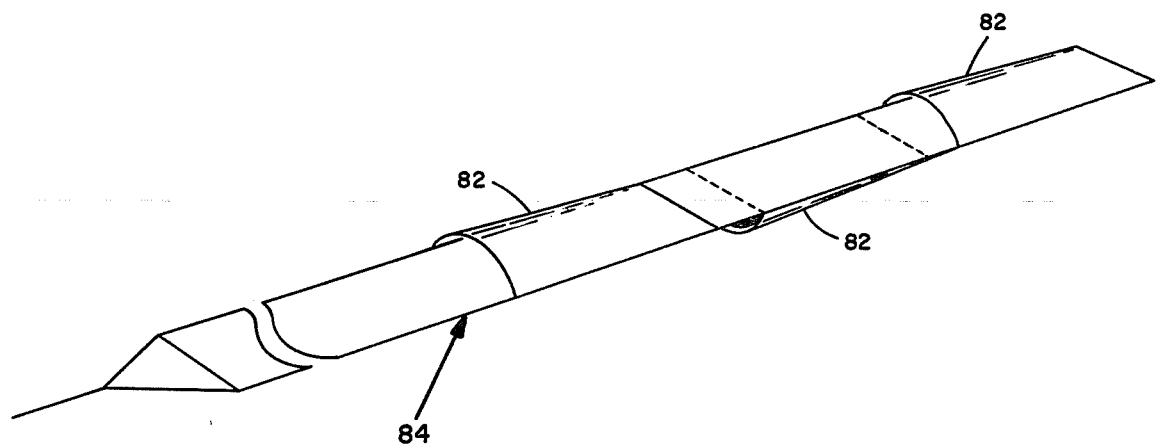
FIG. 8 is a diagrammatic representation of a banner drogue with drag increasing pockets.

One method of augmenting banner drag is to provide pockets such as those illustrated at 82 in FIG. 8 sewn onto a banner 84. The number and size of the pockets determine the additional drag and banner length can be minimized. In one embodiment each pocket is opened toward the anchored end of the banner and sealed to the banner at the opposite end.

With pockets, however, it is desireable to release the banner once the object is floating on the surface of the water to prevent tilting of the buoy. A simple device suitable for releasing the banner is illustrated in FIG. 9.

Figure 9:
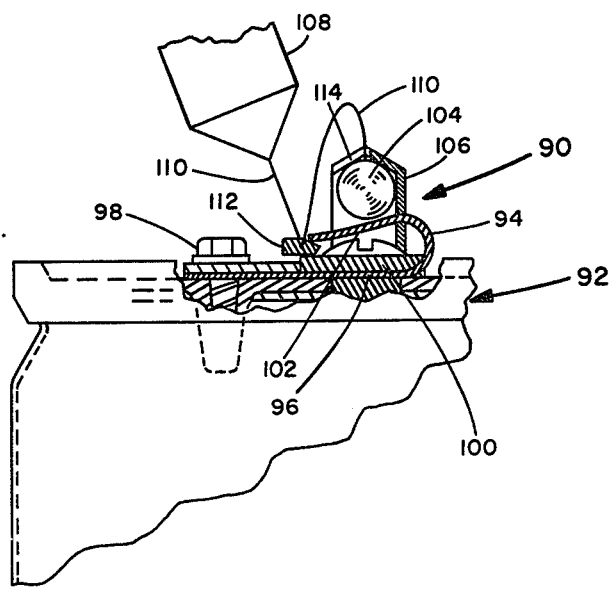
FIG. 9 is a diagrammatic representation of a banner release mechanism.

Referring to FIG. 9 a release mechanism generally illustrated at 90 is located at the top 92 of a sonobuoy package. The release mechanism includes a folded spring 94 anchored to top 92 along its bottom surface 96 via bolting apparatus 98 and 100.

The free end of the spring forms a downwardly sloping ramp 102 which has an end spaced from the anchored portion of the spring. A detent such as a ball weight 104 is positioned between this ramp and a conical seat 106. A banner 108 is attached to ball weight 104 via a strand 110 which runs through and is attached to a shipping block 112. The strand is then accomodated in a "V" notch 114 in seat 106. Shipping block 112 is located between the end of the ramp and the anchored portion of the spring.

In operation, prior to air drop, shipping block 112 prevents ball weight 104 from sliding down ramp 102. When the sonobuoy is dropped, banner 108 pulls out shipping block 112. However ball weight 104 is maintained in seat 106 by the spring tension of spring 94. Thereafter the ball is maintained in seat 106 via the tension of strand 110.

When the sonobuoy impacts the water, spring 94 depresses under the weight of the ball and the ball rolls down the ramp. This is permitted because upon impact strand tension ceases and the strand moves out of "V" notch 114 as the ball rolls out of the seat. This releases the banner drogue.

What has therefore been provided is an inexpensive exceptionally simple method of apparatus for stabilizing a sonobuoy and limiting its descent speed in a readily adjustable manner. Because the subject apparatus limits the entry angle of the sonobuoy its descent speed may be increased to decrease deployment time. Thus the subject apparatus permits the deployment of sonobuoys from a wide range of altitudes.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. Apparatus for deploying drogue apparatus located on top of a package to be air dropped comprising:
a cap having a top, sides and a lower edge adapted to surround the top portion of said package in a loose fit, said cap having an elongated flexible member depending from said lower edge in a direction parallel to a side of said cap and adapted to lie adjacent said package, said elongated flexible member upon being subjected to the airflow around said package when dropped from an aircraft, lifting said cap from said package, thereby to release said drogue apparatus for deployment.

2. The apparatus of claim 1 wherein said member is integral to said cap and wherein the juncture between said member and said cap is of reduced thickness.

3. Apparatus for releasing a strand connected to an air dropped object comprising:
a folded spring attached to the top of said object, with a free end thereof forming a downwardly sloping ramp having an end spaced from the attached portion of said spring;
an indented seat attached to the top of said object facing downwardly above said ramp, said seat having a notch running in the same directon as said ramp; and
detent means positioned between the indented portion of said seat and said ramp, said strand being attached to said detent means and being accomodated in said notch, impact of said object causing deflection of said ramp end towards the attached portion of said spring, thereby releasing said detent means and said strand as said detent means moves down said ramp.

* * * * *